United States Patent
Fuhs et al.

(10) Patent No.: US 7,308,539 B2
(45) Date of Patent: Dec. 11, 2007

(54) CONCURRENT READ ACCESS AND EXCLUSIVE WRITE ACCESS TO DATA IN SHARED MEMORY ARCHITECTURE

(75) Inventors: Ronald Edward Fuhs, Rochester, MN (US); Ryan Scott Haraden, Rochester, MN (US); Nathaniel Paul Sellin, Rochester, MN (US); Scott Michael Willenborg, Stewartville, MN (US)

(73) Assignee: International Business Machines Corporation, Armonk, NY (US)

( * ) Notice: Subject to any disclaimer, the term of this patent is extended or adjusted under 35 U.S.C. 154(b) by 311 days.

(21) Appl. No.: 11/016,218

(22) Filed: Dec. 17, 2004

(65) Prior Publication Data

US 2006/0136677 A1    Jun. 22, 2006

(51) Int. Cl.
  *G06F 12/00* (2006.01)
  *G06F 13/00* (2006.01)
  *G06F 13/28* (2006.01)

(52) U.S. Cl. .................. 711/141; 711/144; 711/145; 711/147; 711/150; 711/168; 710/106

(58) Field of Classification Search ................ 711/168, 711/141
  See application file for complete search history.

(56) References Cited

U.S. PATENT DOCUMENTS 5,553,266 A * 9/1996 Metzger et al. ............. 711/144
5,918,248 A * 6/1999 Newell et al. ............... 711/147
6,700,871 B1 * 3/2004 Harper et al. ............... 370/235
6,823,511 B1 * 11/2004 McKenney et al. .......... 718/102
6,965,893 B1 * 11/2005 Chan et al. .................... 707/8
7,000,078 B1 * 2/2006 Jones et al. ................. 711/141
2002/0138706 A1 * 9/2002 Hugly ......................... 711/163
2003/0023794 A1 * 1/2003 Venkitakrishnan et al. . 710/105
2004/0228429 A1 * 11/2004 Schanke et al. ............. 375/372

OTHER PUBLICATIONS

Jim Handy, the Cache Memory book 2nd editiion, Academic press ltd., 1998 Pertinent pp. 138, 139, 142-144, 146.*

* cited by examiner

*Primary Examiner*—Hong Kim
*Assistant Examiner*—Marwan Ayash
(74) *Attorney, Agent, or Firm*—Wood, Herron & Evans LLP (57) ABSTRACT

Concurrent read access and exclusive write access are provided in a shared memory architecture to permit one or more devices in the shared memory architecture to maintain read access to a block of memory such as a cache line while one device has exclusive permission to modify that block of memory. By doing so, a device that has permission to modify may make updates to its copy of the block of memory without invalidating other copies of the block of memory, and potentially enabling other devices to continue to read data from their respective copies of the block of memory without having to retrieve the updated copy of the block of memory.

17 Claims, 3 Drawing Sheets

CONCURRENT READ ACCESS AND EXCLUSIVE WRITE ACCESS TO DATA IN SHARED MEMORY ARCHITECTURE

FIELD OF THE INVENTION

The invention relates to computers and data processing systems, and in particular to permitting shared access to data in a shared memory architecture.

BACKGROUND OF THE INVENTION

Given the continually increased reliance on computers in contemporary society, computer technology has had to advance on many fronts to keep up with increased demand. One particular subject of significant research and development efforts is parallelism, i.e., the performance of multiple tasks in parallel.

A number of computer software and hardware technologies have been developed to facilitate increased parallel processing. From a hardware standpoint, computers increasingly rely on multiple processors to provide increased workload capacity. Furthermore, some processors have been developed that support the ability to execute multiple threads in parallel, effectively providing many of the same performance gains attainable through the use of multiple processors.

A significant bottleneck that can occur in a multi-processor computer, however, is associated with the transfer of data to and from each processor, often referred to as communication cost. Many computers rely on a main memory that serves as the principal working storage for the computer. Retrieving data from a main memory, and storing data back into a main memory, however, is often required to be performed at a significantly slower rate than the rate at which data is transferred internally within a processor. Often, intermediate buffers known as caches are utilized to temporarily store data from a main memory when that data is being used by a processor. These caches are often smaller in size, but significantly faster, than the main memory. Caches often take advantage of the temporal and spatial locality of data, and as a result, often significantly reduce the number of comparatively-slower main memory accesses occurring in a computer and decrease the overall communication cost experienced by the computer. While some caches may serve all of the processors in a computer, in many instances, dedicated caches are used to serve individual processors or subsets of processors. For example, it is often desirable to incorporate a cache directly on a processor chip to provide the fastest possible access to the data stored in the cache.

Whenever multiple processors or other devices are permitted to access a particular memory, the memory is required to implement some form of shared memory architecture that is capable of maintaining coherence throughout the memory architecture. In particular, whenever a processor attempts to access a particular memory address, typical shared memory architectures retrieve a block of memory often referred to as a cache line that contains the requested data at that address, and store the cache line in a cache accessible by the processor. If that processor subsequently modifies the data in its locally cached copy of the cache line, the copy of the cache line in the main memory is no longer up to date. As a result, if another processor attempts to access that cache line, the shared memory architecture is required to provide some mechanism by which the most recent copy of that cache line can be forwarded to the other processor. In addition, it is often desirable at that time to update the copy of the cache line in the main memory.

A number of shared memory architectures, for example, implement snoop-based coherency protocols, where each cache coupled to a main memory monitors the memory requests issued by other devices, and updates the status of any cache lines stored in its local cache, and/or notifies the other devices of the status of any such cache lines, in response to those requests. An agreed-upon set of states are often used to designate the status of each cache line. One common coherency protocol, for example, referred to as the MSI protocol, assigns each cache line one of three states: a modified state that indicates the cache line is stored in one cache and has been modified, thus rendering the copy in the shared memory out-of-date, a shared state that indicates the cache line is stored in more than one cache and has not been modified by any cache, and an invalid state that indicates that the cache line is not stored in any cache and must be fetched from memory in order to be accessed. Another protocol referred to as the MESI protocol adds to the three states of the MSI protocol, an exclusive state that indicates the cache line is stored in one cache but has not been modified.

Of note, using either the MSI or MESI protocol, multiple caches are permitted to hold multiple copies of a cache line when in a shared state, and furthermore, the processors associated with those caches are able to read the copies of the cache line independently and directly from the respective caches. However, if any processor needs to modify its own copy of the cache line, it is necessary to invalidate the other copies of the cache line in the other caches in connection with modifying the data. In effect, the cache line changes from "shared" to "modified" state, whereby the cache line is discarded in every cache except the cache containing the modified version. Should any other processor wish to access that cache line again, it is necessary for the cache line to be written out to main memory or otherwise transferred to the cache for the other processor to ensure that the other processor has the most recent version of the cache line. The cache line then typically transitions back to a "shared" state. If the original processor then wishes to update the cache line again, another transfer is required back to the "modified" state to permit the processor to modify any data in the cache line.

Particularly if one device is frequently modifying a cache line, and another device is frequently reading the same cache line, the MSI and MESI protocols will require substantial data traffic and delay in copying the cache line back and forth between multiple caches and/or between caches and main memory. The primary performance benefits of caching arise when frequent accesses to a given cache line are capable of being serviced by a cache, without involvement of the rest of the shared memory system. Requiring frequent state changes and copying of data between caches and main memory, and/or between caches and other caches, thus negates many of the performance advantages of caching.

Despite these drawbacks caching has been increasingly used in many computer architectures. In addition, as the components of a computer system continue to increase in complexity and performance, caching has been implemented even within individual computer system components. For example, caching is frequently used in the input/output subsystems of many computer systems, e.g., within input/output adapters (IOA's) such as host channel adapters (HCA's) compliant with the InfiniBand architecture. Caching may be used, for example, to accelerate access to thread-specific context information in a multithreaded HCA that supports the concurrent transmission and reception of data by multiple data streams. The context information includes, among other information, control information that tracks the current status of a communication session between two devices, e.g., packet sequence numbers, acknowledgment tracking information, etc.

Transmitter and receiver circuits in an HCA often operate independently to handle outgoing and incoming data packets over an InfiniBand link. To accelerate the handling of packets associated with given data streams, the context information associated with such data streams is typically retrieved by the transmitter or receiver circuit, as appropriate, with the context information modified as necessary by the transmitter or receiver circuit to manage the data stream. Furthermore, to ensure consistency for the context information, a coherency protocol similar to the MSI and MESI protocols is used to ensure that the context information for a given data stream is consistent even when being accessed by both of the transmitter and receiver circuits.

However, it has been found that, particularly when both the transmitter and receiver circuits are accessing the same context information when processing incoming and outgoing packets associated with the same data stream, significant latency may be introduced due to the need to invalidate the copy of the context information in one circuit when the other circuit modifies the information. As is often the case, only one of the transmitter and receiver circuits may update certain values in the context information, while the other circuit may only read those values. Due to the need to maintain coherence, however, significant data traffic overhead and latency are often introduced, thus decreasing the performance of the HCA.

Therefore, a significant need continues to exist for a manner of maintaining coherency in a shared memory architecture in applications where multiple devices frequently attempt to access the same data.

SUMMARY OF THE INVENTION

The invention addresses these and other problems associated with the prior art by permitting one or more devices in a shared memory architecture to maintain read access to a block of memory such as a cache line while one device has exclusive permission to modify that block of memory. By doing so, a device that has permission to modify may make updates to its copy of the block of memory without invalidating other copies of the block of memory, and potentially enabling other devices to continue to read data from their respective copies of the block of memory without having to retrieve the updated copy of the block of memory.

Therefore, consistent with the invention, coherence may be maintained between a plurality of devices coupled to a shared memory architecture by retrieving a first copy of a block of memory in a first device to obtain exclusive write access to the block of memory, and retrieving a second copy of the block of memory in a second device to obtain read access to the block of memory, where the second device has read access to the block of memory concurrently with the first device having exclusive write access to the block of memory.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

The embodiments discussed and illustrated hereinafter permit one or more devices in a shared memory architecture to maintain read access to a block of memory such as a cache line while one device has exclusive permission to modify that block of memory. By doing so, a device that has permission to modify may make updates to its copy of the block of memory without invalidating other copies of the block of memory, and potentially enabling other devices to continue to read data from their respective copies of the block of memory without having to retrieve the updated copy of the block of memory.

A shared memory architecture consistent with the invention may incorporate practically any memory architecture where a shared copy of data is maintained at one level of storage (e.g., in a main memory, a non-volatile memory, a shared cache memory, a NUMA memory, etc.), and multiple storage devices, e.g., shared or dedicated caches, NUMA memories, buffers, etc. are capable of concurrently maintaining copies of that shared copy of data. In this regard, a device that has access to a shared copy of data may be a processor, a controller, a cache, or any other logic circuitry capable of reading and/or writing data stored in a shared memory architecture. In addition, a shared memory may be logically arranged into various blocks of memory, whether specific memory addresses or blocks of memory addresses, e.g., cache lines, pages, segments, data structures, variables, values, etc.

The invention may find particular benefit in applications where the data being accessed by multiple devices is control-type information that is used by a device to make decisions about how to operate. In such applications, the fact that a particular piece of data may have been modified in another device may not be particularly problematic, and may be easily rectified by updating the device's copy in cases where the validity of the data is in question. Indeed, in some applications, where one device is storing, or producing data, while another device is using, or consuming data, it is often acceptable for the consumer to be "behind" the producer, and synchronize at a later time when the currency of the data is required to be established.

In the illustrated embodiment discussed below, for example, the shared memory is a segment of main storage and/or an embedded cache memory on a Host Channel Adapter (HCA), where the devices capable of accessing the shared memory are transmitter and receiver circuits used to process outgoing and incoming data packets communicated over an InfiniBand network. Furthermore, the blocks of memory being stored in the shared memory are blocks of context information used to manage the state of various data streams established between paired components in an InfiniBand network.

In the specific embodiment discussed below, transmitter and receiver circuits are compatible with the InfiniBand Reliable Connected (RC) service, which supports the ability for a device that receives data packets from another device to acknowledge receipt of multiple data packets using a single acknowledge data packet. In this environment, packets are identified with monotonically increasing sequence numbers, with acknowledge packets returned with the sequence number of the last data packet being acknowledged. Moreover, the RC service protocol limits the number of data packets that can be transmitted without being acknowledged, requiring the transmitter of a data stream to pause after too many non-acknowledged packets have been transmitted.

As such, for each data stream, context information is maintained that tracks both the sequence number of the last packet transmitted (in a variable Next Send Packet Sequence Number (NSPSN)), as well as the sequence number of the last packet from which an acknowledgment has been received (in a variable Last Acked Packet Sequence Number (LAPSN)). The transmitter circuit updates NSPSN as it transmits packets, while the receiver circuit updates LAPSN as acknowledgments are received. The maximum number of unacknowledged packets is controlled by a variable Nmax, and the transmitter circuit of an adapter such as an HCA is required to suspend packet transmission if the number of unacknowledged packets (or more specifically, the difference between NSPSN and LAPSN+1) equals Nmax.

Consequently, while the receiver circuit of an HCA is required to update the LAPSN variable, the transmitter circuit still requires read access in order to check whether transmission of additional packets needs to be suspended until an acknowledgment is received.

Embodiments consistent with the invention therefore provide a coherency protocol whereby the transmitter circuit has read access to the LAPSN variable concurrently with exclusive write access the LAPSN variable being provided to the receiver circuit. While specific state names should not be used to limit the invention, the scenario described herein is in many respects similar to providing the receiver circuit with exclusive or modified access to the LAPSN variable concurrently with providing shared access to the transmitter circuit. In this application, the state in which the receiver circuit is granted access to the LAPSN variable is described as "shared with permission to modify"; however, it will be appreciated that this condition need not be identified in this manner, and indeed, a separate state as such need not be defined in order to implement the invention in many embodiments.

By doing so, the receiver circuit, which is a more critical resource with respect to the LAPSN variable, and thus more latency sensitive, is permitted to update the LAPSN variable without regard to any coherency issues with respect to the variable on the part of the transmitter circuit. Moreover, the transmitter circuit is permitted to read the variable irrespective of any changes made to the variable by the receiver circuit.

In the illustrated embodiment, the copy of the variable maintained by the transmitter circuit is not updated or brought current until the difference between NSPSN and LAPSN+1 equals Nmax, at which point the transmitter is required to update its copy of the variable, e.g., by requesting the current copy from the receiver circuit. Given the monotonically increasing sequence numbers of transmitted packets, the only risk of having stale data in the transmitter circuit is that the transmitter circuit may decide to halt transmission due to unacknowledged packets when in fact the receiver circuit may have received acknowledgments that the transmitter circuit has not yet been made aware. In such an instance, the only penalty is the need for the transmitter circuit to obtain a current copy of the variable from the receiver circuit. This penalty, however, is insignificant when compared to the potential bottlenecks that could occur were the receiver circuit required to obtain exclusive access to the variable and invalidate any copy of the variable in the transmitter circuit each time the variable needed to be updated.

In such an implementation, both the transmitter circuit and the receiver circuit are permitted to use a shared resource. Exclusive access by both devices is not allowed; however, the receiver circuit has effectively been given exclusive access by default, which status is maintained until the transmitter circuit attempts to obtain the most recent copy of the data, e.g., by performing a lock/DCLAIM command.

It will be appreciated by one of ordinary skill in the art having the benefit of the instant disclosure, however, that the embodiments discussed herein are merely exemplary in nature, and that the invention may be used in a wide variety of other applications and environments consistent with the invention.

Figure 1:
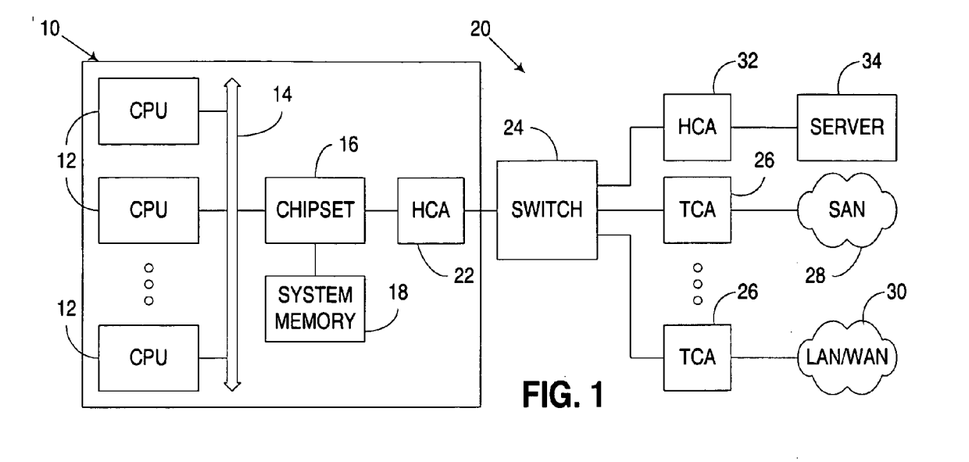
FIG. 1 is a block diagram of an apparatus including a host channel adapter implementing a shared memory architecture consistent with the invention.

Turning to the Drawings, wherein like numbers denote like parts throughout the several views, FIG. 1 illustrates an exemplary computer 10 suitable for implementing a shared memory architecture consistent with the invention.

Computer 10 generally includes a processor/memory complex including one or more central processing units (CPU's) 12 coupled via a processor bus 14 to a chipset 16. Chipset 16 provides access to a system memory 18, as well as to an input/output (I/O) subsystem 20 capable of providing external input and output functionality for the processor/memory complex.

In the illustrated embodiment, I/O subsystem 20 is implemented using an InfiniBand-compatible architecture, including a host channel adapter (HCA) 22 that interfaces chipset 16 with a high speed serial switch 24, and providing a channel-based, switched-fabric, point-to-point, full-duplex serial interconnect architecture for ultimately interfacing the processor/memory complex with a plurality of external devices, e.g., various peripheral devices such as a storage area network (SAN) 28 and a local or wide area network (LAN/WAN) 30 coupled to switch 24 via target channel adapters (TCA's) 26, and another computer, e.g., server 34 coupled to switch 24 via HCA 32. It will be appreciated that a wide variety of other peripheral devices may be coupled computer 10 consistent with the invention.

The discussion hereinafter will therefore focus on an implementation of the invention within HCA 22, providing I/O functionality for apparatus 10 within an InfiniBand environment, as noted above. As will become more apparent below, however, the invention may be utilized in connection with practically any computer or other electronic device (including components of a computer) implementing a shared memory architecture.

Computer 10, or any subset of components therein, may be referred to hereinafter as an "apparatus". It should be recognized that the term "apparatus" may be considered to incorporate various data processing systems such as computers and other electronic devices, as well as various components within such systems, including individual integrated circuit devices or combinations thereof. Moreover, within an apparatus may be incorporated one or more logic circuits or circuit arrangements, typically implemented on one or more integrated circuit devices, and optionally including additional discrete components interfaced therewith.

It should also be recognized that circuit arrangements are typically designed and fabricated at least in part using one or more computer data files, referred to herein as hardware definition programs, that define the layout of the circuit arrangements on integrated circuit devices. The programs are typically generated in a known manner by a design tool and are subsequently used during manufacturing to create the layout masks that define the circuit arrangements applied to a semiconductor wafer. Typically, the programs are provided in a predefined format using a hardware definition language (HDL) such as VHDL, Verilog, EDIF, etc. Thus, while the invention has and hereinafter will be described in the context of circuit arrangements implemented in fully functioning integrated circuit devices, those skilled in the art will appreciate that circuit arrangements consistent with the invention are capable of being distributed as program products in a variety of forms, and that the invention applies equally regardless of the particular type of computer readable signal bearing media used to actually carry out the distribution. Examples of computer readable signal bearing media include but are not limited to recordable type media such as volatile and non-volatile memory devices, floppy disks, hard disk drives, CD-ROM's, and DVD's, among others, and transmission type media such as digital and analog communications links.

Figure 2:
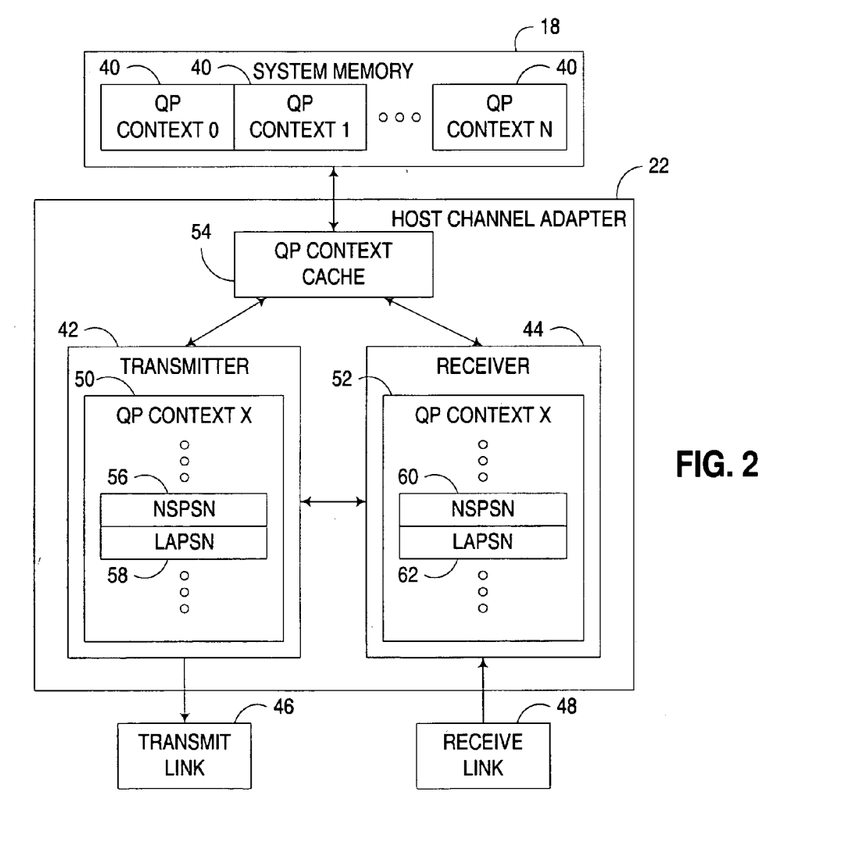
FIG. 2 is a block diagram of an exemplary implementation of the host channel adapter of FIG. 1.

FIG. 2 illustrates HCA 22 in greater detail. HCA is configured to support a large number of concurrent data streams or threads, e.g., up to 24 million data streams. Associated with each such data stream is a queue pair (QP) context 40, which stores context information for the data stream. A copy of each QP context 40 is stored in main memory 18, and retrieved as necessary by each of a transmitter circuit 42 and a receiver circuit 44 in HCA 22 whenever the respective circuit is working on data packets associated with that data stream. Transmitter circuit 42 is coupled to a transmit link 46, and receiver circuit 44 is coupled to a receive link 48, representing the communication links coupling HCA 22 to an InfiniBand network.

As noted above, each of transmitter and receiver circuits 42, 44 retrieves contexts 40 from main memory 18 whenever working on data packets associated with a particular data stream, and maintains cached copies 50, 52, respectively. Each circuit 42, 44 may optionally cache multiple contexts. Moreover, as illustrated by cache 54, it may further be desirable to provide an intermediate cache onboard HCA 22 for storing multiple contexts and minimizing the frequency in which contexts are required to be retrieved from main memory 18 by HCA 22.

As mentioned above, to manage the transmission and acknowledgment of data packets in a data stream, each context includes NSPSN and LAPSN variables, respectively storing the next send packet sequence number and last acked packet sequence number. Copies of these variables in cached copies 50, 52 are illustrated at 56, 58, 60 and 62.

Consistent with the invention, when both of circuits 42, 44 have cached copies of the same context, receiver circuit 44 is granted exclusive write access to the LAPSN variable, while transmission circuit 42 is granted read access to the variable. Of note, whenever only one of the circuits has a cached copy of the context (as may occur if the other circuit is working on another data stream), the circuit that has the only cached copy may be granted exclusive access, irrespective of the circuit.

It will be appreciated that the access rights granted to LAPSN may be limited to the variable itself, or may be associated with the entire context. Moreover, it will be appreciated that exclusive write access may be granted to either circuit 42, 44, or may only be capable of being granted to transmitter circuit 42, thus only allowing receiver circuit 44 read access when copies are maintained in both circuits.

Figure 3:
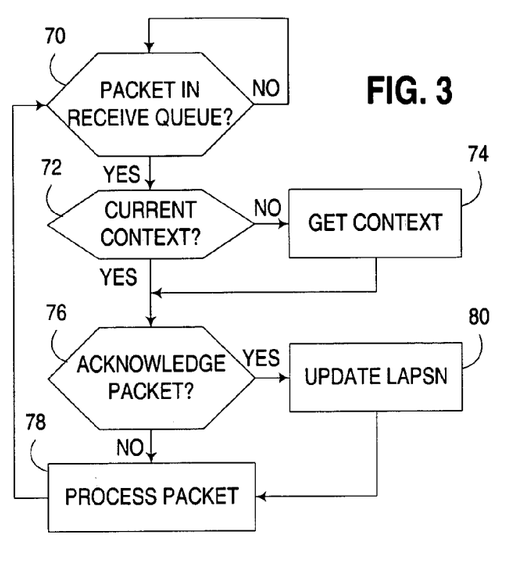
FIG. 3 is a flowchart illustrating the operation of the receiver circuit of FIG. 2.

FIG. 3 next illustrates the operation of receiver circuit 44 in greater detail, beginning in block 70 by waiting for a packet to be received from the receive link into a receive queue maintained in HCA 22. Upon reception of a packet, block 70 passes control to block 72 to determine whether the packet is associated with the currently cached context in the receiver circuit, e.g., by analyzing the packet for an identifier associated with the data stream with which the context is associated. If the context is not currently cached, control passes to block 74 to retrieve the context from either main memory 18 or context cache 50.

If the context is also currently being cached in transmitter circuit 42, receiver circuit 44 will get the context in shared with permission to modify state, which may include retrieving an updated copy of the context from the transmitter circuit, rather than from the main memory or context cache. Otherwise, receiver circuit 44 will get the context in exclusive state. In addition, it may also be necessary to write back to the context cache the prior context stored in the receiver circuit, e.g., if any data in the context was modified by the receiver circuit.

Once the context has been retrieved in block 74, or if block 72 determines the context was already cached, control passes to block 76 to determine whether the packet is an acknowledgment packet. If not, control passes to block 78 to process the packet in an appropriate manner, including removing the packet from the receive queue. However, if the packet is an acknowledgment packet, block 76 passes control to block 80 to update the copy of LAPSN in the cached copy of the context to equal the sequence number of the last acknowledged packet identified in the acknowledgment packet. Control then passes to block 78 to complete processing the packet in an appropriate manner. Control then returns to block 70 to process the next packet in the receive queue.

Figure 4:
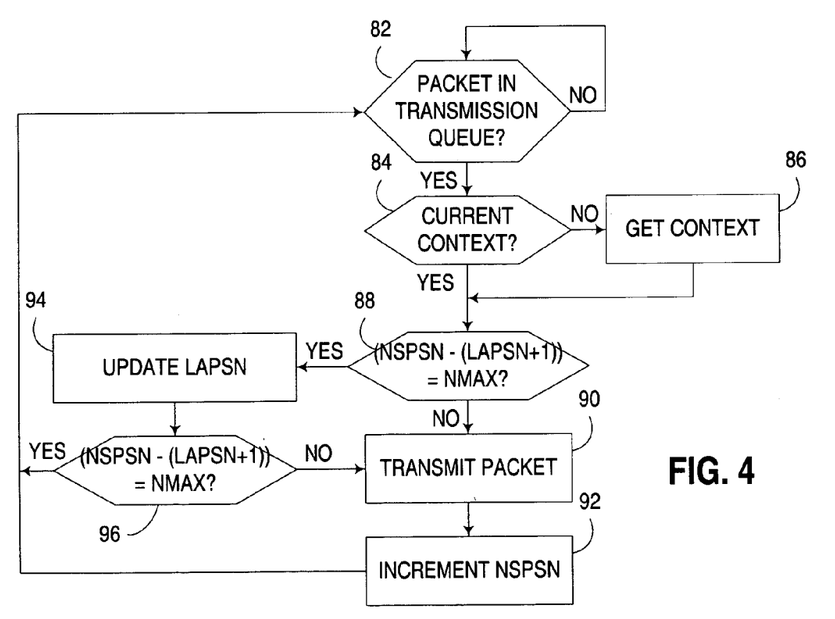
FIG. 4 is a flowchart illustrating the operation of the transmitter circuit of FIG. 2.

FIG. 4 next illustrates the operation of transmitter circuit 42 in greater detail, beginning in block 82 by waiting for a packet to be received from the host computer into a transmit queue maintained in HCA 22. Upon reception of a packet, block 82 passes control to block 84 to determine whether the packet is associated with the currently cached context in the transmitter circuit, e.g., by analyzing the packet for an identifier associated with the data stream with which the context is associated. If the context is not currently cached, control passes to block 86 to retrieve the context from either main memory 18 or context cache 50.

If the context is also currently being cached in receiver circuit 44, transmitter circuit 42 will get the context in shared state, having only read access to the context, which may include retrieving an updated copy of the context from the receiver circuit, rather than from the main memory or context cache. Otherwise, transmitter circuit 42 will get the context in exclusive state. In addition, it may also be necessary to write back to the context cache the prior context stored in the transmitter circuit, e.g., if any data in the context was modified by the transmitter circuit.

Once the context has been retrieved in block 86, or if block 84 determines the context was already cached, control passes to block 88 to determine whether the difference between the values of NSPSN and LAPSN+1 as stored in the cached copy of the context equals Nmax, the number of unacknowledged packets that triggers a suspension of transmission of data packets by the transmitter circuit. If not, control passes to block 90 to transmit the packet over the transmit link in an appropriate manner, including the removal of the packet from the transmit queue, then to block 92 to increment NSPSN to reflect the transmission of a packet with the current sequence number. Control then returns to block 82 to process any other pending packets in the transmission queue.

Returning to block 88, if the difference does equal Nmax, control passes to block 94 to update LAPSN, e.g., by retrieving a current copy of the variable, or of the entire context, from receiver circuit 44. The retrieval of the variable may occur via a direct pathway between circuits 42, 44, or alternatively, may incorporate the initiation of a write back to the context cache by the receiver circuit coupled with a fresh retrieval from the context cache by the transmitter circuit.

Once LAPSN has been updated, control then passes to block 96 to again check whether the difference between NSPSN and LAPSN+1 equals Nmax. If not (indicating that a later acknowledgment was received), control passes to block 90 to transmit the packet in the manner discussed above. Otherwise, block 96 passes control to block 82 to process other packets on the transmit queue, effectively suspending transmission of additional packets from the current context until another acknowledgment is received. It will be appreciated that since the packet for the current context is not transmitted at this time, the packet will remain on the transmission queue and will be processed at a later time, with the sequence number maintaining proper sequencing of packets in each data stream.

Figure 5:
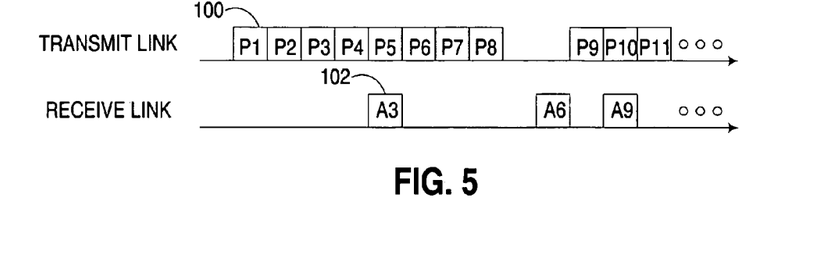
FIG. 5 is a functional timing diagram illustrating an exemplary packet transmission sequence using the host channel adapter of FIG. 2.

As an example of the operation of HCA 22 in the transmission of data packets, FIG. 5 illustrates a functional timing diagram of the relative timings of data packets 100 transmitted over the transmit link and acknowledgment packets 102 received over the receive link. In this example, Nmax is equal to 5, meaning that the transmitter circuit will suspend transmission upon reaching five unacknowledged packets.

As can be seen from the figure, a sequence of packets P1-P11 are shown being transmitted by the transmit link, as are a series of acknowledgment packets received from the receive link, designated A3, A6 and A9, with the sequence number assigned to each acknowledgment packet indicating the last acknowledged data packet being acknowledged by the acknowledge packet. Of note, up to the transmission of packet P8, the difference between NSPSN and LAPSN+1 stays below 5. However, after transmission of packet P8, the difference equals 5 (NSPSN=9 and LAPSN=3). As such, transmission of further packets is suspended until receipt of acknowledgment packet A6, whereby transmission then resumes with packet P9. Thereafter, the difference never equals 5, and as such, packets P10 and P11 are transmitted without delay.

It will be appreciated by one of ordinary skill in the art having the benefit of the instant disclosure that the HCA embodiment discussed herein does not require sophisticated snoop logic or coherency directories. Nonetheless, in other embodiments, it may be desirable to extend a conventional MSI or MESI protocol to support concurrent exclusive write and read access. Such an extended protocol may find use in many environments that utilize MSI or MESI protocols, e.g., multiprocessor architectures.

Figure 6:
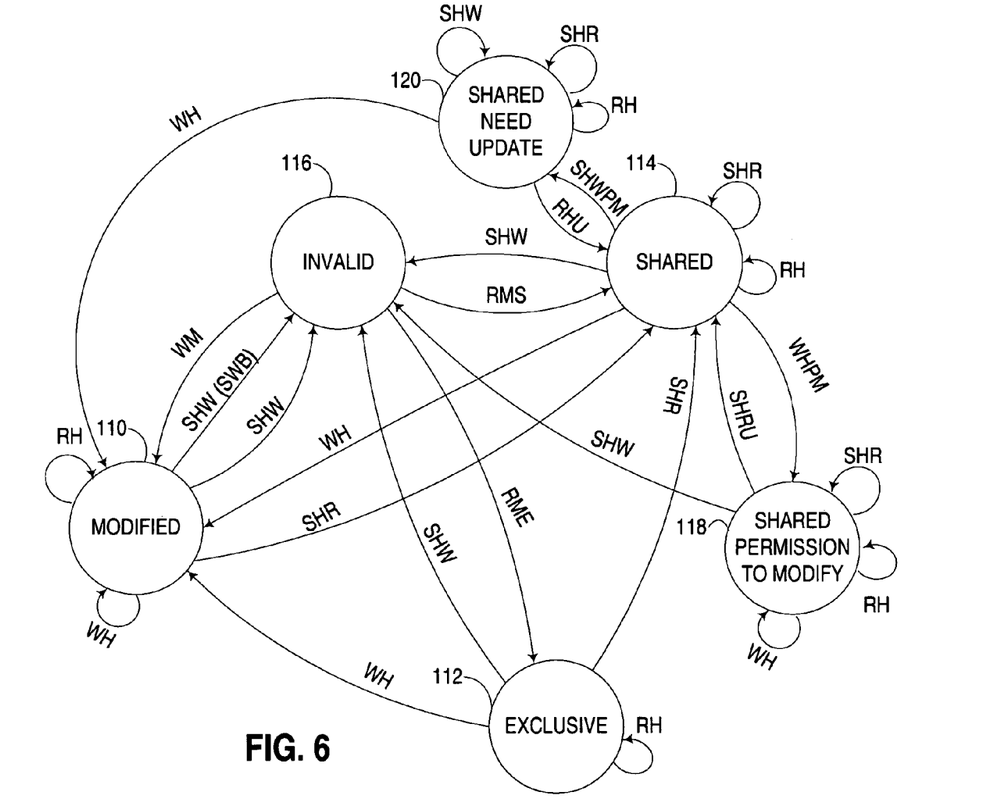
FIG. 6 is a state diagram of an exemplary coherency algorithm incorporating a shared with permission to modify state.

FIG. 6, for example, illustrates a state diagram including in part the states and state transitions for the conventional MESI protocol, incorporating modified 110, exclusive 112, shared 114 and invalid states 116, and with transitions defined therebetween for write miss (WM) operations, write hit (WH) operations, read miss (RM) operations (including read miss, exclusive (RME) and read miss, shared (RMS)), read hit (RH) operations, snoop hit write (SHW) operations, and snoop hit read (SHR) operations. Also illustrated is an additional snoop hit write (SHW) sector write back (SWB) operation that transitions a cache line from modified to invalid. This particular protocol is supported, for example, by the PowerPC processor architecture, the use and configuration of which are well known in the art.

Extension of the MESI protocol shown in FIG. 6 is provided through the addition of a new state, "shared permission to modify" state 118, which in the illustrated embodiment, is reached whenever a cache line is in shared state 114, and one device initiates a write hit permission to modify (WHPM) operation on a memory bus. The WHPM operation may be initiated as a specialized operation by a device, or in the alternative, may simply be implemented as a conventional write by a device with permission to enter this state whenever a cache line is in the shared state.

A cache line exits state 118 either in response to a SHW from another device, or alternatively, a snoop hit read update (SHRU) operation, which may be implemented as a conventional snoop hit read operation by a device known to be a consumer of the data in the cache line, or may be a dedicated operation issued by another device having a shared copy of the cache line and desiring to receive an updated copy of the cache line. When receiving such an operation, the current copy of the cache line is written back to lower memory or passed directly to the other devices, with a transition occurring back to shared state 114, indicating that all cached copies of the cache line are up to date.

While only state 118 may be added to the protocol in some implementations, it may be desirable to provide an additional state, "shared need update" state 120, which is entered in response to a snoop hit write permission to modify (SHWPM) operation resulting from snooping a WHM operation by another device. In this state, it may be desirable to support a read hit update (RHU) operation, which is separate from a conventional read operation, to initiate retrieval of an updated copy of the cache line. In addition, it may be desirable for a device to force a write back of the cache line through a WH operation so that the device can obtain exclusive and modified access to the cache line. In such an instance, the cache line would need to be updated prior to writing the new operation to the cache line.

If a separate state 120 is not provided, similar functionality may be implemented by assigning one device ownership or exclusive write access of the cache line when in state 118, and allowing all other devices to issue read hit update (RHU) operations whenever it is desired to update a cached copy of the cache line.

It will be appreciated that the state diagram of FIG. 6 is merely exemplary in nature, and that the concurrent provision of read access and exclusive write access to multiple devices in a shared memory architecture may be supported in a wide variety of other protocols. Thus, the invention is not limited to the protocols illustrated herein.

Various modifications may be made to the illustrated embodiments without departing from the spirit and scope of the invention. For example, various state names may be used to identify a state in which one device is permitted to modify a block of memory while other devices are permitted to read that block of memory, even if modified. For example, a "shared with permission to modify state", which is separate from an exclusive or modified state, may be defined, or in the alternative, an exclusive or modified state may simply incorporate this functionality. Moreover, as exemplified by the HCA embodiment above, data need not be identified with any particular state identifier at all, so long as comparable functionality is implemented elsewhere in the logic circuitry of an electronic device.

It will be appreciated that implementation of the functionality described above within logic circuitry disposed in a chipset or other appropriate integrated circuit device, would be well within the abilities of one of ordinary skill in the art having the benefit of the instant disclosure. It will also be appreciated that various additional modifications may be made to the illustrated embodiments consistent with the invention. Therefore, the invention lies in the claims hereinafter appended.

What is claimed is:

1. A method of maintaining coherence between a plurality of devices coupled to a shared memory architecture, the method comprising:
    in a first device, retrieving a first copy of a block of memory and obtaining exclusive write access to the block of memory;
    in a second device, retrieving a second copy of the block of memory and obtaining read access to the block of memory, wherein the second device has read access to the block of memory concurrently with the first device having exclusive write access to the block of memory;
    modifying the first copy of the block of memory in the first device while the second device has read access to the block of memory;
    using data in the second copy of the block of memory in the second device after the first copy of the block of memory has been modified and while the first device has exclusive write access to the block of memory; and
    after using the data in the second copy of the block of memory, updating the second copy of the block of memory based upon the first copy of the block of memory in the first device;
    wherein the first device comprises a receiver circuit and the second device comprises a transmitter circuit, the transmitter and receiver circuits respectively configured to transmit and receive packets of data arranged in a sequence, with each packet associated with a packet identifier, wherein the block of memory includes a last acknowledged packet identifier representing a last packet for which an acknowledgment has been received.

2. The method of claim 1, wherein the block of memory comprises a cache line.

3. The method of claim 1, wherein the receiver circuit is configured to update the last acknowledged packet identifier in connection with receiving an acknowledgment packet, and wherein the transmitter circuit is configured to use the data in the second copy of the block of memory by comparing the last acknowledged packet identifier stored in the second copy of the block of memory with a next send packet identifier, and to update the second copy of the block of memory based upon the first copy of the block of memory in the first device by requesting the first copy of the block of memory from the receiver circuit to update the last acknowledge packet identifier in the transmitter circuit.

4. A method of maintaining coherence between a plurality of devices coupled to a shared memory architecture, the method comprising:
    in a first device, retrieving a first copy of a block of memory and obtaining exclusive write access to the block of memory;
    in a second device, retrieving a second copy of the block of memory and obtaining read access to the block of memory, wherein the second device has read access to the block of memory concurrently with the first device having exclusive write access to the block of memory; and
    respectively accessing data in the first and second copies of the block of memory with the first and second devices while the second device has read access to the block of memory concurrently with the first device having exclusive write access to the block of memory;
    modifying the first copy of the block of memory in the first device while the second device has read access to the block of memory;
    using data in the second copy of the block of memory in the second device after the first copy of the block of memory has been modified and while the first device has exclusive write access to the block of memory;
    and after using the data in the second copy of the block of memory, updating the second copy of the block of memory based upon the first copy of the block of memory in the first device;
    wherein the first device comprises a receiver circuit and the second device comprises a transmitter circuit, the transmitter and receiver circuits respectively configured to transmit and receive packets of data arranged in a sequence, with each packet associated with a packet identifier, wherein the block of memory includes a last acknowledged packet identifier representing a last packet for which an acknowledgment has been received.

5. The method of claim 4, wherein obtaining exclusive write access comprises transitioning the block of memory to a shared with permission to modify state.

6. The method of claim 4, wherein obtaining exclusive write access in the first device is performed after obtaining read access in the second device and without invalidating the second copy of the block of memory in the second device.

7. The method of claim 4, further comprising, updating the second copy of the block of memory in the second device by retrieving the first copy of the block of memory from the first device.

8. The method of claim 4, wherein the block of memory comprises a cache line.

9. The method of claim 4, further comprising:
    in the receiver circuit, updating the last acknowledged packet identifier in connection with receiving an acknowledgment packet; and
    in the transmitter circuit, using the data in the second copy of the block of memory by comparing the last acknowledged packet identifier stored in the second copy of the block of memory with a next send packet identifier, and updating the second copy of the block of memory based upon the first copy of the block of memory in the first device by requesting the first copy of the block of memory from the receiver circuit to update the last acknowledge packet identifier in the transmitter circuit.

10. A circuit arrangement configured for use in a shared memory architecture, the circuit arrangement comprising:

a first device configured to retrieve a first copy of a block of memory and obtain exclusive write access to the block of memory; and a second device configured to retrieve a second copy of the block of memory and obtain read access to the block of memory, wherein the second device has read access to the block of memory concurrently with the first device having exclusive write access to the block of memory;

wherein the first device is configured to modify the first copy of the block of memory while the second device has read access to the block of memory;

wherein the second device is configured to use data in the second copy of the block of memory after the first copy of the block of memory has been modified and while the first device has exclusive write access to the block of memory, and after using the data in the second copy of the block of memory, update the second copy of the block of memory based upon the first copy of the block of memory in the first device;

wherein the first device comprises a receiver circuit and the second device comprises a transmitter circuit, the transmitter and receiver circuits respectively configured to transmit and receive packets of data arranged in a sequence, with each packet associated with a packet identifier, wherein the block of memory includes a last acknowledged packet identifier representing a last packet for which an acknowledgment has been received.

11. The circuit arrangement of claim 10, wherein the first device is configured to obtain exclusive write access by transitioning the block of memory to a shared with permission to modify state.

12. The circuit arrangement of claim 10, wherein the first device is configured to obtain exclusive write access in the first device after the second device obtains read access and without invalidating the second copy of the block of memory in the second device.

13. The circuit arrangement of claim 10, wherein the second device is further configured to update the second copy of the block of memory by retrieving the first copy of the block of memory from the first device.

14. The circuit arrangement of claim 10, wherein the block of memory comprises a cache line.

15. The circuit arrangement of claim 10, wherein the receiver circuit is configured to update the last acknowledged packet identifier in connection with receiving an acknowledgment packet, and wherein the transmitter circuit is configured to use the data in the second copy of the block of memory by comparing the last acknowledged packet identifier stored in the second copy of the block of memory with a next send packet identifier, and to update the second copy of the block of memory based upon the first copy of the block of memory in the first device by requesting the first copy of the block of memory from the receiver circuit to update the last acknowledge packet identifier in the transmitter circuit.

16. An integrated circuit device comprising the first and second devices of claim 10.

17. A computer comprising the first and second devices of claim 10.

* * * * *